Feb. 21, 1928.

F. R. McGEE 1,659,607

DUST CATCHER

Filed Dec. 18, 1925   4 Sheets-Sheet 1

Witnesses:
Edwin Trueb

Inventor:
FRANK R. McGEE,
by D. Anthony Usina
his Attorney.

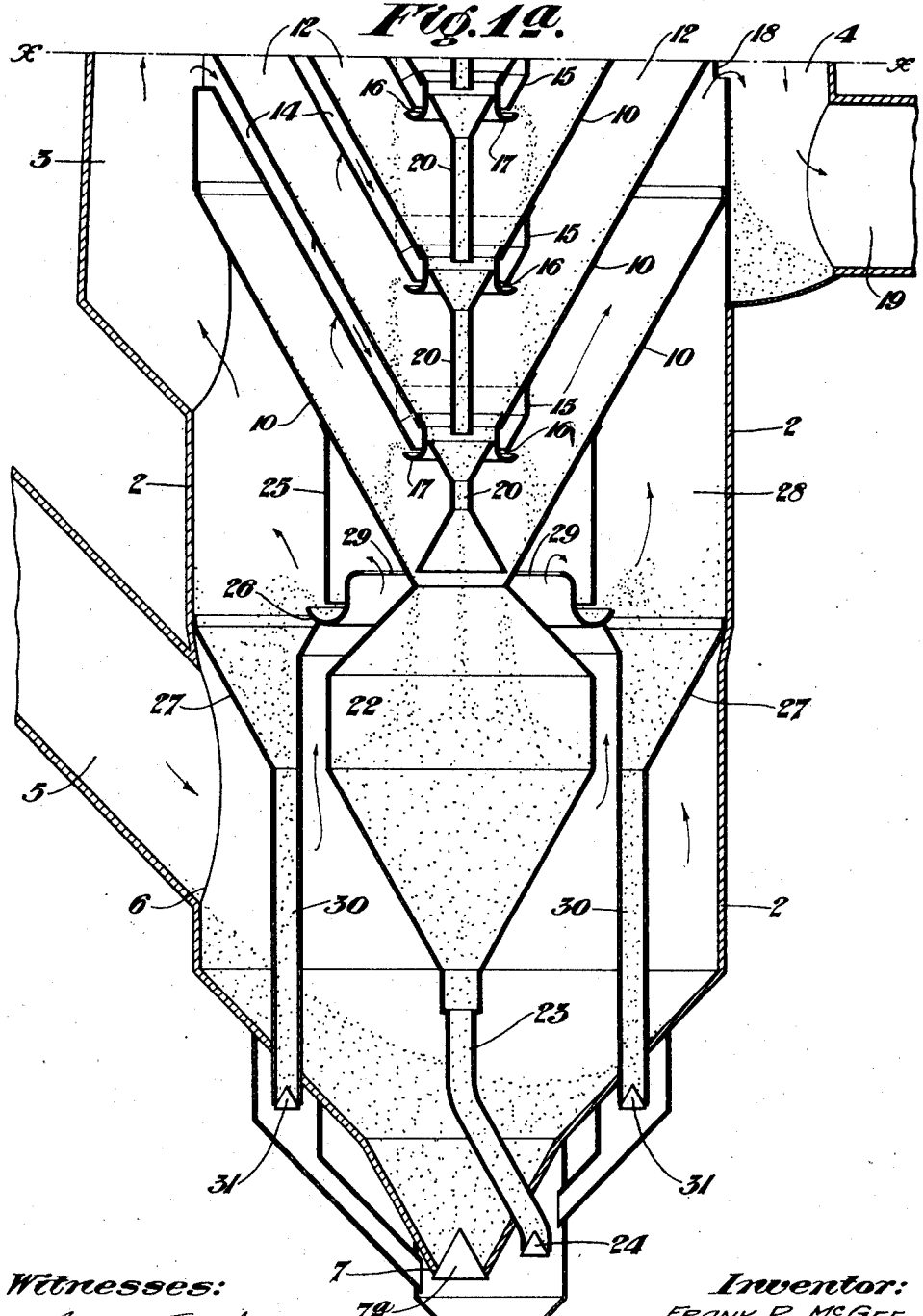

Feb. 21, 1928.

F. R. McGEE 1,659,607

DUST CATCHER

Filed Dec. 18, 1925

Witnesses:
Edwin Trueb

Inventor:
FRANK R. McGEE,
by D. Anthony Usina
his Attorney.

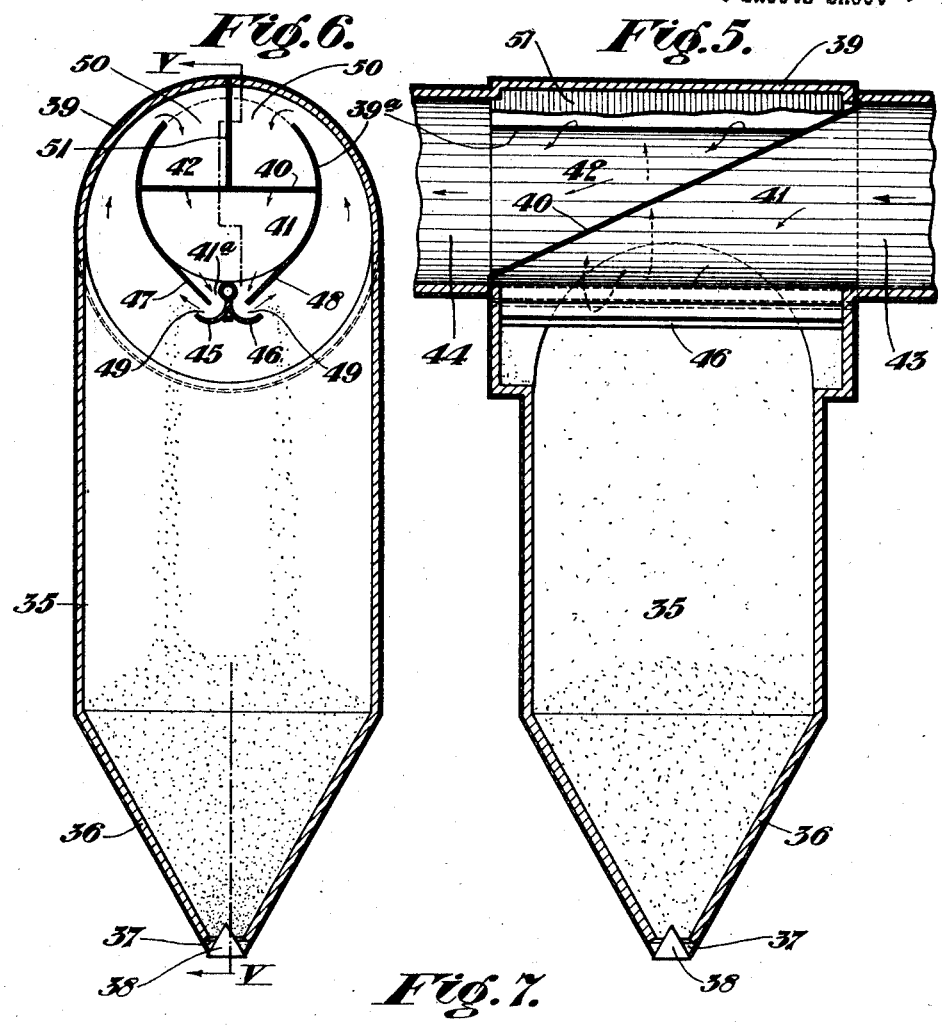

Patented Feb. 21, 1928.

1,659,607

UNITED STATES PATENT OFFICE.

FRANK R. McGEE, OF STEUBENVILLE, OHIO.

DUST CATCHER.

Application filed December 18, 1925. Serial No. 76,211.

This invention relates to dust catchers and more particularly to dry dust catchers primarily adapted for separating dust and other particles of foreign matter from blast furnace gases, although their use is not limited to blast furnace gases, but they may be used wherever it is desired to separate or clean dust or other foreign matter from gases.

The object of the present invention is to provide a novel form of gas cleaner in which the foreign matter will be thrown out of the gases by centrifugal force, will settle out by gravity and will float out due to the reduction of velocity of the gases at predetermined points in their travel through the cleaner.

In the drawings:

Figure 1 is a partial vertical sectional elevation through a dust catcher constructed in accordance with this invention.

Figure 1ᵃ is a continuation of Figure 1.

Figure 5 is a vertical sectional view of a modified form of dust catcher, taken on the line V—V of Figure 6.

Figure 6 is a vertical sectional view of the modified form of dust catcher shown in Figure 5.

Figure 7 is an enlarged detail showing the nozzle construction of the catcher of Figures 5 and 6.

Figure 1:
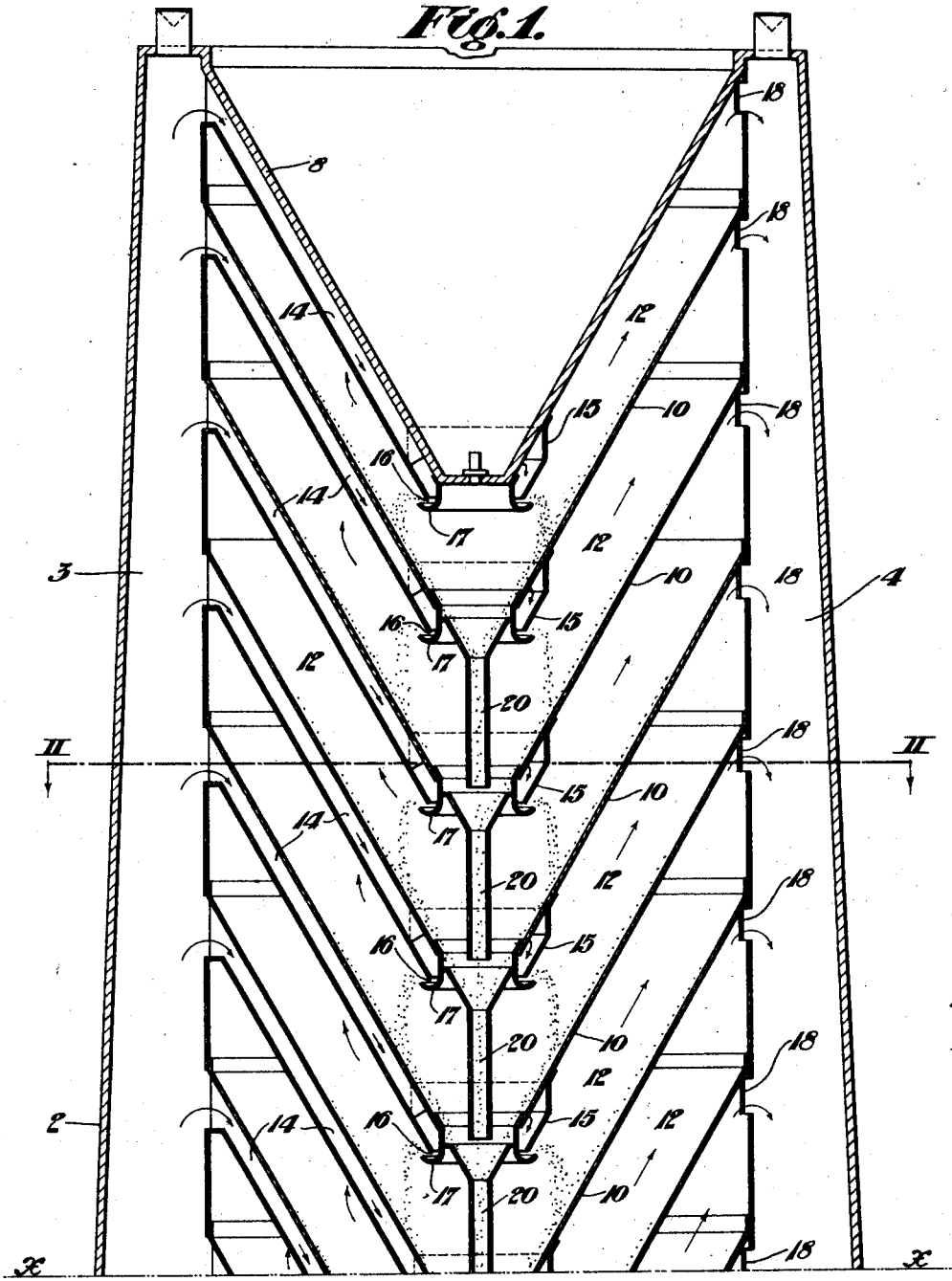
Figure 2:
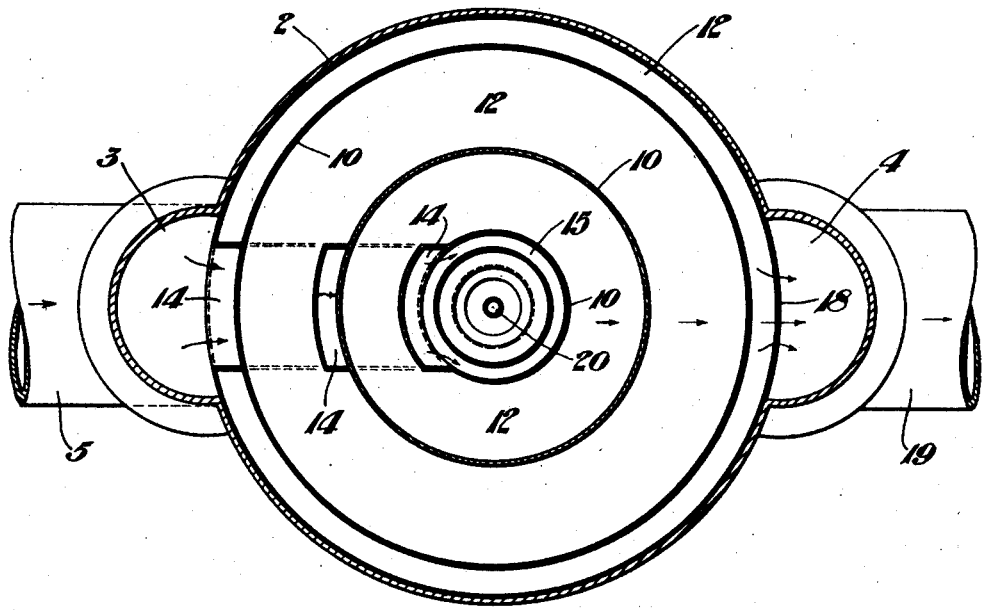
Figure 2 is a transverse sectional view taken on the line II—II of Figure 1.
Figure 3:
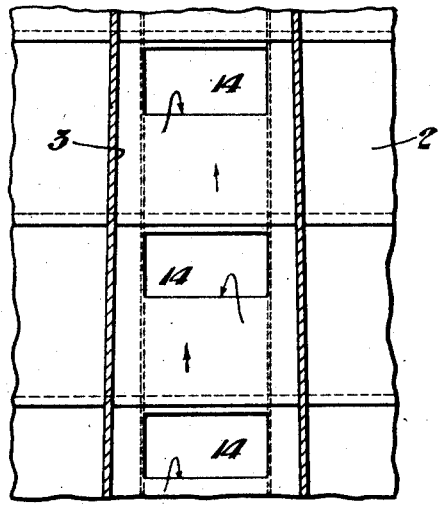
Figures 3 and 4 are sectional details through portions of the gas distributing and collecting conduits, respectively.
Figure 4:
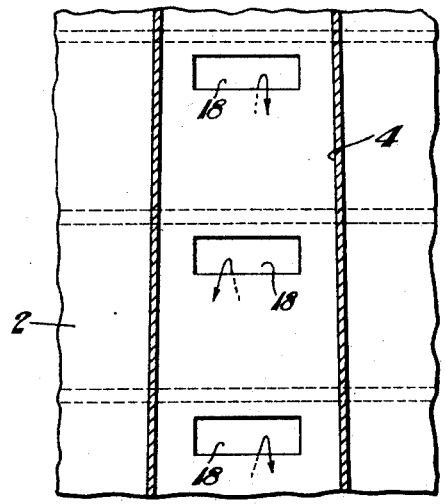

Referring more particularly to the dust catcher shown in section in Figures 1 and 1ᵃ of the drawings, the numeral 2 designates the outside wall or casing of the catcher which is preferably of cylindrical cross-section and provided with enlargements 3 and 4 extending vertically at diametrically opposite points to form gas distributing and collecting conduits, respectively.

A dirty gas main or downcomer 5 is inclined downwardly and enters the casing 2 adjacent its lower end at 6. The lower end of the casing 2 is frusto-conical in shape and is provided at its lower end with a discharge port 7 closed by a bell 7ᵃ. The top of the casing 2 is closed by a frusto-conical wall 8.

A plurality of frusto-conical partitions 10 are spaced vertically within the casing 2 forming a series of separating chambers 12. Each of the chambers 12 is provided with an uncleaned or dirty gas inlet conduit 14 of relatively small cross-section along the upper side thereof, which communicates at its outer end with the dirty gas distributing conduit 3 and terminates at its inner or lower end in a circular manifold or distributing head 15. The head 15 is provided with a materially contracted outlet 16 opening into a concave or curved nozzle 17 which causes a sudden change in direction of flow of the gases passing therethrough and imparts a centrifugal whirl to the gases as they enter the chambers 12.

Each of the chambers 12 are provided at their upper end with an outlet opening 18 communicating with the clean gas collecting conduit 4, which conduit is connected at its lower end with a clean gas main 19.

Each of the chambers 12, except the lowermost chamber, is provided at its lower end with a small diameter dust conduit 20 which extends down into the frusto-conical lower end of the next chamber 12, so that the dust collected in each of the chambers will flow down to the lowermost chamber 12. The lowermost chamber 12 communicates directly with a dust collecting chamber 22 which is provided with an outlet conduit 23 extending downwardly through the frusto-conical lower end of the casing 2 and is closed by a bell 24.

A cylindrical skirt 25 depends from the lowermost partition 10 and extends down into close proximity to a concave or curved annular nozzle member 26. A bottom partition wall 27 extends from the bottom of the nozzle 26 outwardly to the casing 2 forming an annular separating chamber 28 which communicates with the lower end of the conduit 3. The nozzle 26 is spaced from the lower end of the lowermost partition 10 forming an inlet 29 for the gas which enters the lower end of the casing 2 from the downcomer 5.

A plurality of dust outlet conduits 30 extend from the chamber 28 through the lower end of the casing 2 and are closed by bells 31.

In operation the dirty gas enters the lower end of the dust catcher from the downcomer 5 and then reverses its direction of flow so that it rises through the inlet 29 to the space above the nozzle 26. As the gases reverse their direction of flow in the lower end of the catcher the heavier particles will drop out of the gases into the lower end of the casing due to said reversal of flow and the sudden expansion of the gas.

The gases entering the space above the nozzle 26 will be increased in velocity due to the small area of the inlet 29 and they will then reverse their direction of flow downward through the nozzle 26. The nozzle 26 will further increase the velocity of the gases and due to the concave or curved shape of the nozzle the direction of flow of the gases will be suddenly changed and a centrifugal force imparted to them as they flow into the chamber 28. The change in flow direction and force imparted to the gases by the nozzle 26 coupled with the sudden expansion of the gases as they enter the chamber 28 will cause a large quantity of the entrained foreign matter to be thrown and float out of the gas stream in the chamber 28 from which it will escape through the conduits 30. The nozzle 26 causes a quick or sharp reversal of flow of the gases and as the gases rise in the relatively large chamber 28, considerable foreign matter not removed by the effect of the nozzle on the gases or by the sudden reduction in velocity will settle out by gravity.

The partially cleaned gases will pass from the chamber 28 upwardly through the conduit 3 and enter the several chambers 12 through conduits 14 terminating in annular distributing heads 15. The gases pass from the heads 15 through the narrow outlet openings or ports 16 against the concave or curved nozzles 17 and their velocity is greatly increased by the small ports 16 and their direction of flow is suddenly reversed by the nozzles 17 so that an effective centrifugal force is applied to the gases. As the gases leave the nozzles 17 with considerable increased velocity they enter the relatively large separating chambers 12 where they expand and flow upwardly to escape through the outlet ports 18 into the clean gas collecting conduit 4.

The sudden reversal of the direction of flow of the gases which imparts a centrifugal force thereto, combined with the expansion of the gases as they enter the chambers 12 causes the major portion of the impurities remaining in the gases at this time to be thrown and float out into the outer portion of the chamber where there is a zone of relative quiet, since it is beyond the flow stream of the gases. Other impurities in the gases will settle out of the gases as they rise through the chambers 12.

Due to the frusto-conical shape of the partition walls 10 defining the chambers 12, the foreign matter separated from the gases will flow along the partitions 10 and down through the conduits 20 into the collecting chamber 22 to be discharged through the conduit 23.

In Figures 5 and 6 I have shown a modified and very much simplified form of my invention. In the construction of Figures 5 and 6, the numeral 35 designates the outer wall or casing of the body portion or dust collecting chamber of the dust catcher, which is preferably cylindrical in cross-section and is provided with a frusto-conical bottom or lower end 36 having a discharge opening or port 37 at its lower end closed by a bell 38.

The upper end of the casing 35 is closed by an arched housing 39 forming a separating chamber and enclosing a chamber $39^a$, which is divided by an inclined wall 40 to form a dirty gas chamber 41 and clean gas receiving chamber 42. A dirty or dust laden gas main 43 enters the chamber 41 and a clean gas main 44 communicates with the chamber 42.

The lower wall of the chamber 41 is provided with a slot or opening $41^a$ in which is mounted a double nozzle having curved or concave nozzle portions 45 and 46 and nozzle center plates 47 and 48 which extend from the edges of the slot or opening into close proximity to the nozzle portions 45 and 46, respectively, to form constricted inlet nozzle openings 49.

The upper or clean gas receiving chamber 42 is provided with a longitudinally extending opening 50 along its top to permit the entrance of the clean gas, and a vertically extending baffle wall 51 extends from the wall 40, forming the bottom of the chamber 42, to the arched housing 39 so as to prevent the clean gas which rises up along both sides of the chamber $39^a$ from flowing beyond the opening 50.

In operation the dirty or dust ladened gases enter the chamber 41 from the main 43 and are forced to flow through the constricted nozzle openings 49. As the gases flow through the openings 49, their velocity is greatly increased and they are forced around the concave nozzles 45 and 46 so as to cause a sudden reversal of their direction of flow and impart a considerable reversal of direction of flow and centrifugal force thereto. The centrifugal force imparted to the gases will throw out a major portion of the dust and other foreign matter from the gases permitting it to settle into the body portion of the catcher. The gases as they pass from the nozzles 45 and 46 will suddenly expand and their velocity will be materially decreased thereby providing an area of calm or quiet flowing gases which will permit some of the impurities still carried by the gases to float out of the stream of gases, while still other impurities will drop out of the gases by gravity as they rise to enter the clean gas chamber 42 through the opening 50.

While I have shown and described certain specific embodiments of my invention it will be understood that I do not wish to be limited thereto, since various modifications may be made without departing from the scope of my invention as defined in the appended claims.

I claim:

1. A dust catcher comprising a main casing, a dirty gas inlet adjacent the one end thereof, a dirty gas distributing conduit and a main clean gas collecting conduit on opposite sides of said casing, partition walls preventing direct passage of the dirty gas to said dirty gas distributing conduit and forming expansion and dust separation chambers, one of said chambers communicating with said dirty gas inlet and the other of said chambers being in communication with said dirty gas distributing conduit, a constricted gas passageway between said chambers, a concave nozzle mounted in said passageway and adapted to cause a sudden change in the direction of flow of the gas passing from said first named chamber to said second named chamber to throw out a material part of the dust and other impurities, said second named chamber being of such size as to permit a material expansion and lessening of velocity of said gases, whereby some of the dust and impurities will float and settle out of the gases, a plurality of other chambers within said casing and communicating separately with said dirty gas distributing conduit whereby said dirty gas is divided into a plurality of small streams, and means for separating dust and impurities in each of said last named chambers.

2. A dust catcher comprising a main casing, a dirty gas inlet adjacent the one end thereof, a dirty gas distributing conduit and a main clean gas collecting conduit on opposite sides of said casing, partition walls preventing direct passage of the dirty gas to said dirty gas distributing conduit and forming expansion and dust separation chambers, one of said chambers communicating with said dirty gas inlet and the other of said chambers being in communication with said dirty gas distributing conduit, a constricted gas passageway between said chambers, a concave nozzle mounted in said passageway and adapted to cause a sudden change in the direction of flow of the gas passing from said first named chamber to said second named chamber to throw out a material part of the dust and other impurities, said second named chamber being of such size as to permit a material expansion and lessening of velocity of said gases, whereby more of the dust and impurities will float and settle out of the gases, a plurality of other chambers within said casing, separate branch conduits connecting each of said chambers with said dirty gas distributing conduit, and a concave nozzle at the chamber end of each of said branch conduits adapted to cause a sudden change in the direction of flow of the gas passing into said chambers to throw out a material part of the dust and other impurities remaining in the gas, and means for collecting the dust and impurities.

3. A dust catcher comprising a main casing, a dirty gas inlet adjacent the one end thereof, a dirty gas distributing conduit and a main clean gas collecting conduit on opposite sides of said casing, partition walls preventing direct passage of the dirty gas to said dirty gas distributing conduit and forming expansion and dust separation chambers, one of said chambers communicating with said dirty gas inlet and the other of said chambers being in communication with said dirty gas distributing conduit, a constricted gas passageway between said chambers, a concave nozzle mounted in said passageway and adapted to cause a sudden change in the direction of flow of the gas passing from said first named chamber to said second named chamber to throw out a material part of the dust and other impurities, said second named chamber being of such size as to permit a material expansion and lessening of velocity of said gases, whereby more of the dust and impurities will float and settle out of the gases, a plurality of other chambers within said casing, separate branch conduits connecting each of said chambers with said dirty gas distributing conduit, and a concave nozzle at the chamber end of each of said branch conduits adapted to cause a sudden change in the direction of flow of the gas passing into said chambers to throw out a material part of the dust and other impurities remaining in the gas, said last named chambers being of such size as to permit a material expansion of the gases, and said last named chambers being in communication with said clean gas collecting main.

4. In a dust catcher for separating dust and other foreign matter from gases, at least one separating chamber having an inlet for dust laden gases, and an outlet for clean gases above said inlet, said inlet being constricted so as to materially increase the velocity of said gases and said separating chamber being of such size as to permit sudden expansion of the gases passing through said inlet, a horizontally arranged concave nozzle at said inlet adapted to cause a sudden change in the direction of flow of the gases passing from said inlet into said separating chamber, whereby the dust and foreign matter is thrown out of said gases and is free to settle into said chamber below said nozzle and out of the flow path of said gas, while other dust will float and drop out of said gas due to the sudden expansion and reversal of flow of said gases.

In testimony whereof, I have hereunto set my hand.

FRANK R. McGEE.